Oct. 3, 1961 C. J. HOEBING 3,002,444
ELECTRICALLY HEATED, SMOKE PRODUCING BARBECUE GRILL
Filed Sept. 18, 1959 2 Sheets-Sheet 1
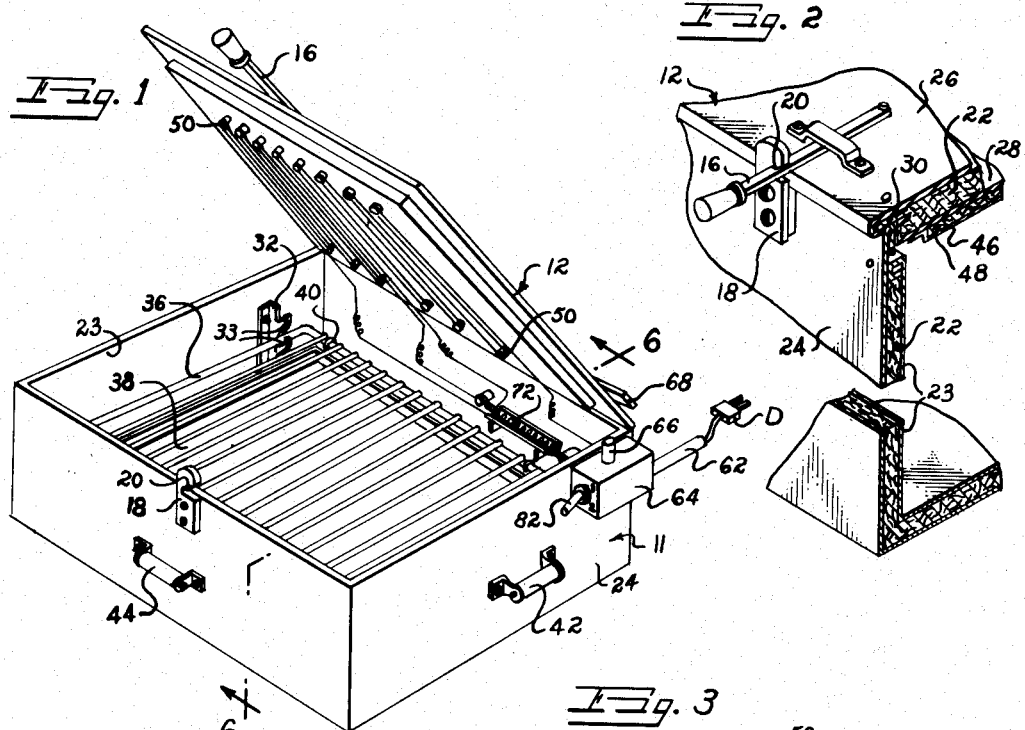
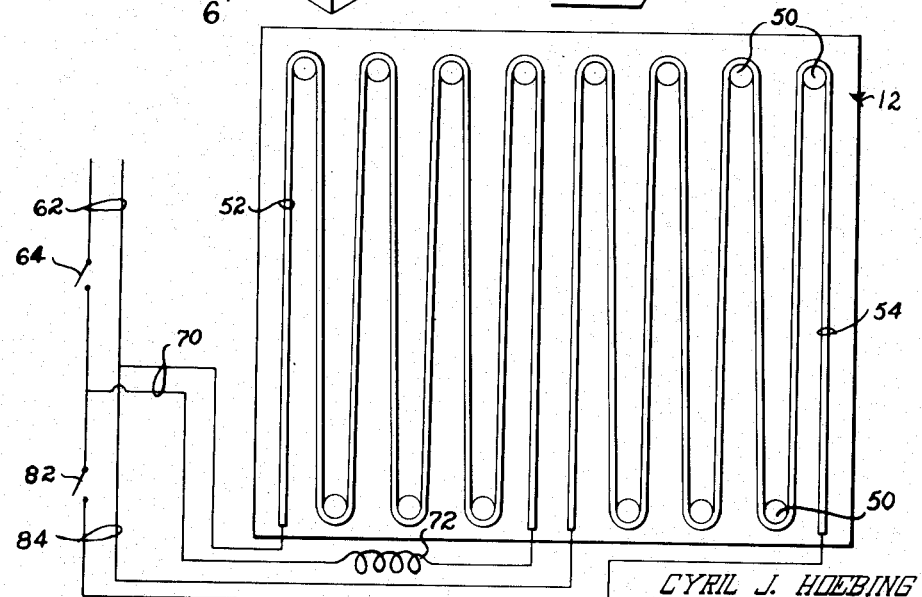
CYRIL J. HOEBING
INVENTOR.
BY
Wayland D. Keith
HIS AGENT Oct. 3, 1961 C. J. HOEBING 3,002,444
ELECTRICALLY HEATED, SMOKE PRODUCING BARBECUE GRILL
Filed Sept. 18, 1959 2 Sheets-Sheet 2
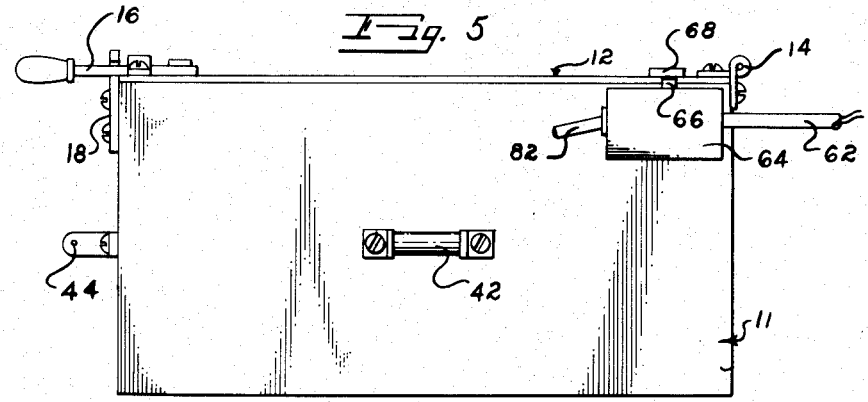
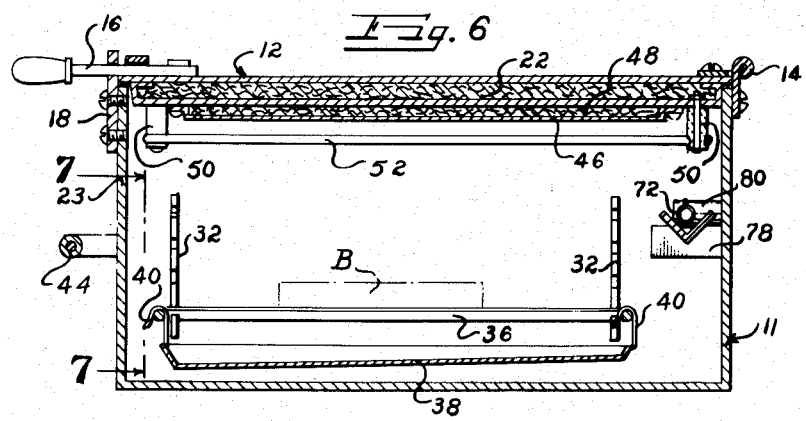
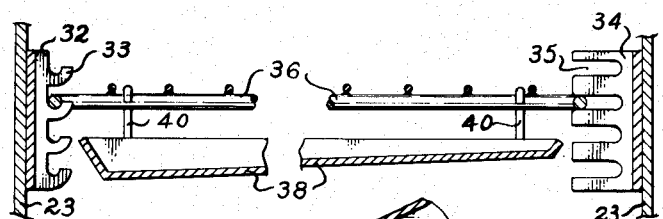
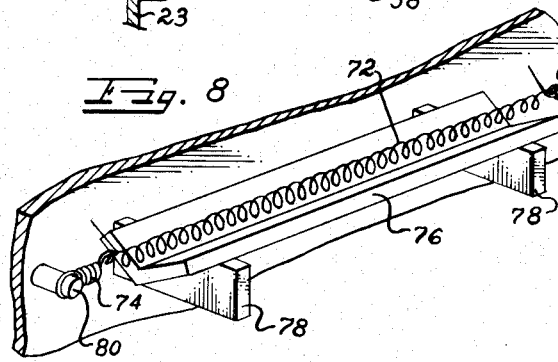
CYRIL J. HOEBING
INVENTOR.
BY
Wayland D. Keith
HIS AGENT

United States Patent Office 3,002,444
Patented Oct. 3, 1961

3,002,444
ELECTRICALLY HEATED, SMOKE PRODUCING BARBECUE GRILL
Cyril J. Hoebing, 1619 S. 8th St., Chickasha, Okla.
Filed Sept. 18, 1959, Ser. No. 840,960
1 Claim. (Cl. 99—260)

This invention relates to portable barbecue grills and more particularly to an electrically heated, smoke producing barbecue grill which may be used indoors, as well as out of doors, and which will produce some one of several desired "smoke" flavors instantly, and which will retain the smoke within the housing during the process of cooking the meat or other food being barbecued.

Various barbecue grills or broilers have been proposed heretofore, but these usually required charcoal or the like, which required the charcoal to be "kindled" or lighted, and required other preparatory work to be performed before the meats or the like could be barbecued.

With the present device, the meat starts cooking instantly and natural wood smoke may be produced in a matter of seconds to give the meat a savory "hickory smoked" flavor without the use of charcoal. Other flavors, of any desired wood, may be produced, without the objectionable feature of excessive ashes being produced. The present device is heated electrically, in such manner as to produce an even heat of the correct temperature for barbecuing.

An object of this invention is to provide an electrically heated, instant smoke producing barbecue grill in which the smoke is retained, within a closed housing, during the cooking process.

Another object of the invention is to provide a barbecue grill wherein the juices cooked from the meat or the like are caught in a receptacle for basting the food during cooking and/or for use as gravy, or in sauce or the like.

A further object of the invention is to provide an electrically heated barbecue grill wherein the heat may be regulated to barbecue meat or other food products the desired length of time at the proper temperature.

A still further object of the invention is to provide an insulated barbecue grill, in which a rack is located, which grill is compact, and is substantially air tight, so it may be used indoors, if desired, without the necessity of venting.

Yet another object of the invention is to provide a barbecue grill which is light in weight, easy and economical to use, easy to clean and to maintain, and which is low in the cost of manufacture.

A yet further object of the invention is to provide an electric barbecue grill heating element wherein the primary heating elements are completely encased within a tubing so as to obviate breakage of the heating elements, and to insure against electric shock to the "cook."

With these objects in mind and others which will become manifest as the description proceeds, reference is to be had to the accompanying drawings in which like reference characters designate like parts in the several views thereof, in which:

FIG. 1 is a perspective view of the device, taken from the front and a side, showing the lid in open position, and showing the interior construction of the device;

FIG. 2 is an enlarged, fragmentary, perspective view of a portion of the top of the lid, the front wall of the grill and the latch, with parts of the lid and wall being broken away and shown in section, to bring out the details of construction;

FIG. 3 is a diagrammatic view of the wiring and heating elements of the device, shown on the inside of the lid;

FIG. 4 is an enlarged, fragmentary plan view of a portion of one of the heating elements, with parts broken away and shown in section to bring out the details of construction;

FIG. 5 is a side elevational view of the barbecue grill showing the lid thereof in closed position;

FIG. 6 is a longitudinal, sectional view taken on the line 6—6 of FIG. 1, looking in the direction indicated by the arrows, with the lid being shown in closed position;

FIG. 7 is a longitudinal, sectional view taken on the line 7—7 of FIG. 6, looking in the direction indicated by the arrows, with parts broken away and with parts shortened to bring out the details of construction; and FIG. 8 is an enlarged, fragmentary, perspective view of the smoke creating element, with parts thereof being shown in section.

With more detailed reference to the drawing, the numeral 11 designates generally a housing, which housing is rectangular in form and has a lid 12 hinged thereto by means of hinge 14, which hinge is preferably elongated and of the type known as a piano hinge, and which extends across one side of the housing and the complementary edge of the lid 12. A latch 16, which comprises a pivoted lever adapted to swing in a plane parallel to the top of lid 12 and is pivotally mounted on the top thereof near the front side of the lid so that the latch lever will swing into a notch 20 in keeper 18, which keeper is mounted on the exterior of the front wall of the housing near the top thereof. The top of the notch 20 slopes inwardly and downwardly at an acute angle from the open side thereof, so as to cause the lever 16 to bindingly engage the lid with the top walls of the housing.

The housing 11 preferably has an inner wall 23 and an outer wall 24, with a space therebetween, which space receives a suitable insulation material, such as asbestos, or other heat resistant material, as indicated at 22. The housing 11 has an inner bottom plate 25 which is spaced above the bottom plate 27, with insulating material 22 therebetween, as indicated in FIG. 2. The lid 12 also contains insulation material 22 between the top plate 26 and an inner plate 28 thereof. A sheet of gasket material 30, such as asbestos, extends below the top plate 26 and the plate is hemmed over the lower edge thereof so the asbestos will form a gasket with the upper edge of the upstanding housing walls, thereby maintaining the housing substantially smoke tight during the process of barbecuing the meat or other food.

The inside of the housing 11 has a pair of spaced apart supports 32 at one end and a pair of spaced apart supports 34 at the opposite end, which supports are secured to the inner walls 23 of the housing 11 in such manner as to receive and support a wire rack 36, which rack is preferably made of longitudinal bars of metal secured to a frame, which bars are suitably spaced apart so as to receive meat or the like thereon, as indicated at B, in FIG. 6, which is to be barbecued.

The supports 32 have spaced apart hooks 33 arranged vertically for receiving the frame bars of rack 36 therein, in the desired adjusted relation with respect to the electric heating element, which will be brought out more in detail hereinafter. The supports 34 have horizontal slots 35 arranged therein at a height to be complementary to the height of hooks in supports 33, so when it is desired to position the rack 36 at a given height, the frame may be engaged in one of the slots 35 and moved toward the throat of the slot until the frame may be passed into the proper opening between hooks 33, whereupon, the rack will be held in secure position.

A drip pan 38 has hooks 40 thereon, which hooks are adapted to extend upward and engage bars of rack 36 so as to be supported therebelow. It is preferable to have the drip pan 38 so constructed that one of the corners thereof is lower than the other corners, so that the juices from the food being barbecued may be readily recovered with a basting syringe for basting the meat, as desired, and for removal of the juice preparatory to cleaning the grill.

The housing 11 preferably has handles 42, one on each end thereof, which handles will enable the grill unit to be lifted horizontally, while in use, or to be carried by two people. However, because of the lightness of the unit, a handle 44 is also provided on the front of the housing, so that the unit may be readily carried by one person using one hand. It is preferable to make the unit of relatively light gauge metal, such as aluminum, sheet steel, or the like. The lid 12 has a metallic sheet 46 secured on the underside thereof and covering at least the greater portion of the area of the rack 36, which sheet 46 is preferably made of bright aluminum, nickel or chrome plated material, so as to form a heat reflector. It is preferable to have insulation 48 intermediate the plate 46 and the bottom plate 28 of the lid 12, so as to further insulate the lid.

Rows of ceramic insulators 50 are arranged on the underside of plate 28 on opposite sides thereof, around which insulators electric heating element circuits 52 and 54 are supported for furnishing the heat for the housing 11. The heating elements 56 may be high electric resistant material such as Nichrome wire, which may be coiled into spirals, as indicated in FIG. 4, which wire may be open, or it may be surrounded by a heat conductor tube, such as copper tube 58, which copper tube is electrically insulated, by a conventional insulating material 60, such as porcelain, clay, glass or the like, from the electrical heating elements in a conventional manner. It is preferable to have at least two circuits of electrical heating elements mounted on the ceramic insulators on the inside of lid 12, which heating elements are connected into a circuit, as indicated in FIG. 3. The numeral 62 indicates the line circuit leading from a suitable source of power, and in which there is a momentary contact switch, which is normally open and which is positioned within the circuit 62 leading to the heating elements 52 and 54. The switch 64 has a spring actuated push button 66, which normally extends upward above the upper surface thereof and within the path of a projection 68 which is secured to the inside of the lid 12. When the lid 12 is open, as shown in FIG. 1, the switch is open, and the push button 66 extends above the upper surface of the wall of the housing 11, by action of spring pressure. However, upon closing the lid 12, as shown in FIG. 5, the push button 66 of switch 64 is depressed by complementally positioned projection 68 on the inside of the lid 12, which switch closes the circuit through branch circuit 70, one leg of which circuit leads through the heating element circuit 52 and through a secondary heating element 72 within the circuit, which element 72 may be an openly coiled heating element, as indicated, or it may be enclosed within insulated tubular casing, such as shown in FIG. 4. The heating element 72 is maintained taut between spring elements 74, so that a trough-like receptacle 76, positioned therebeneath is normally retained in place on brackets 78, or it may be readily removed for cleaning traces of ash therefrom, when desired.

The receptacle 76 is preferably of heat resistant material such as asbestos, mica, ceramic or the like, so as to have electrical insulating qualities, and which is not damaged by intense heat. It is preferable to have the springs 74 mounted on ceramic or other suitable electrical insulators 80, so in event the heating element 72 is wired with openly coiled, Nichrome wire, no damage or shorting will result thereto and thereby.

A manually operated switch 82 is provided within branch circuit 84, which connected heating element circuit 54 through safety, lid operated switch 64 with the power supply circuit 62, however, branch circuit 70 and heating element circuit 52 are connected to the power supply circuit 62 through safety, lid operated switch 64, so it may be readily seen that circuit 52 may be used merely by closing lid 12, which closes switch 64, which causes heating elements within circuit 52, including smoke generating heating element 72 to be heated. However, if additional heat is desired, switch 82 may be closed by moving the toggle handle thereof from the position indicated at "1" to the position indicated at "2," which will energize heating circuit 54. This enables both circuits to be used simultaneously. It is to be pointed out, that upon opening lid 12, all electricity to the heating elements within the housing 11 is cut off, thereby rendering the grill safe for use by anyone, even though heating element circuits 52 and 54 are open coiled Nichrome wire.

*Operation*

When it is desired to barbecue meat and to simultaneously smoke the meat to obtain a particular desired flavor, sawdust, such as hickory sawdust, or sawdust of other suitable wood, is sprinkled within trough-like receptacle 76 until the sawdust at least partially covers the heating element 72, then a suitable piece or pieces of meat, as indicated at B, in FIG. 6, are placed on the rack 36 and seasoned to taste in the usual manner. The lid 12 is then closed, which will cause projection 68 thereon to depress switch push button 66, and lever 16 is swung into notch 20 of keeper 18 so that the angle of the notch cooperates with the lever to force lid 12 downward so that the asbestos gasket 30, as will best be seen in FIG. 2, will form a smoke-tight juncture with the upper edge of housing wall 23, whereupon the circuit 70 is closed by closing switch 64, therefore the resistance heating element 72 will immediately glow to the desired heat to cause instantaneous smoking of the sawdust, which will continue until the sawdust is consumed. However, since the smoke, which results from the heating and burning of the sawdust, is retained within the closed housing 11, the meat B becomes permeated with the smoke and is flavored thereby.

The electric heating elements 56 in circuit 52 will become heated and the metal reflector 46 will intensify the heat on the meat, so it will be thoroughly cooked. If it is desired to barbecue large quantities of meat, or if a more intense heat is desired within housing 11, the switch 82 may be closed to connect heating element circuit 54 in parallel with heating element circuit 52.

The barbecuing of meat of different thicknesses requires that the rack 36 be adjusted close to or away from the heating elements of circuits 52 and 54; therefore the adjustments may be made readily by raising or lowering the rack by means of the hook and slot arrangement 33 and 35, respectively. The juices cooked from the meat are directed into drip pan 38, which may be used in such manner as desired. It is preferable to cook meat a predetermined length of time, whereupon, lid 12 may be raised and the meat B turned, and if needed, an additional supply of sawdust may be sprinkled within receptacle 76, in such manner as to be in contact relation with heating element 72, whereupon the lid 12 is closed and the cooking process continued for the desired length of time.

If it is desired to retain meat or other food in the housing 11, hot over a period of time, but without overcooking, the circuit may be interrupted as by pulling the plug P. The insulated grill will maintain the food hot for a considerable period of time within the closed housing 11.

Having thus clearly shown and described the invention, what is claimed as new and desired to secure by Letters Patent is:

A barbecue grill comprising: a housing having a hinged lid, support members on the inner side of said housing, a transverse rack mounted on said support members within said housing a spaced distance above the bottom thereof, an electrical heating element mounted on the inner side of said hinged lid, a further electrical heating element for producing smoke mounted within said housing, an electric circuit connected to said heating elements, a support mounted on and secured to one of the walls of said housing a spaced distance below said lid, an elongated, V-shaped, removable, di-electric tray to receive granular wood substance mounted in said support with the apex of said V being lower-most, said further electric heating element being mounted in close proximity to the lower inner-most portion of said apex of said V, insulated, resilient means connected to each end of said further heating element to support said further heating element in spaced relation within said elongated, V-shaped, removable, di-electric tray for receiving granular wood substance, which resilient means maintains said further electric heating element in taut relation, and latch means for closing said cover on said housing in substantially smoke tight relation.

References Cited in the file of this patent

UNITED STATES PATENTS

| | | |
|---|---|---|
| Re. 19,089 | Parker | Feb. 20, 1934 |
| 2,020,446 | Weisel | Nov. 11, 1935 |
| 2,262,910 | Aller | Nov. 18, 1941 |
| 2,715,898 | Michaelis et al. | Aug. 23, 1955 |
| 2,839,989 | Persinger | June 24, 1958 |
| 2,847,932 | More | Aug. 19, 1958 |